(12) United States Patent
Isomura

(10) Patent No.: US 8,279,055 B2
(45) Date of Patent: Oct. 2, 2012

(54) TIRE PRESSURE MONITORING SYSTEM AND PRESSURE MONITORING UNIT

(75) Inventor: Makoto Isomura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 337 days.

(21) Appl. No.: 12/787,775

(22) Filed: May 26, 2010

(65) Prior Publication Data

US 2010/0300192 A1    Dec. 2, 2010

(30) Foreign Application Priority Data

May 27, 2009    (JP) .................................. 2009-128293

(51) Int. Cl.
*B60C 23/02* (2006.01)
*B60C 23/00* (2006.01)
*G01M 17/02* (2006.01)

(52) U.S. Cl. .......... 340/442; 340/447; 73/146; 73/146.3

(58) Field of Classification Search ............... 73/146, 73/146.3, 146.4; 340/442–447
See application file for complete search history.

(56) References Cited

U.S. PATENT DOCUMENTS

| | | | | |
|---|---|---|---|---|
| 6,441,727 B1 * | 8/2002 | LeMense | ...................... | 340/442 |
| 6,954,687 B2 | 10/2005 | Taguchi et al. | | |
| 6,965,305 B2 | 11/2005 | Taguchi et al. | | |
| 7,015,801 B1 * | 3/2006 | Juzswik | ........................ | 340/442 |
| 7,592,903 B2 * | 9/2009 | Kochie | .......................... | 340/442 |
| 7,592,904 B2 * | 9/2009 | Kochie et al. | ................. | 340/442 |
| 7,623,025 B2 * | 11/2009 | Miller | ....................... | 340/426.33 |
| 7,639,122 B2 * | 12/2009 | Kochie et al. | ................. | 340/442 |
| 7,661,299 B2 | 2/2010 | Kusunoki | | |
| 8,035,499 B2 * | 10/2011 | Kochie et al. | ................. | 340/442 |
| 8,058,979 B2 * | 11/2011 | Miller et al. | .............. | 340/426.33 |
| 8,072,320 B2 * | 12/2011 | Kochie et al. | ................. | 340/447 |
| 2010/0013618 A1 * | 1/2010 | Patel et al. | ..................... | 340/447 |

FOREIGN PATENT DOCUMENTS

| | | |
|---|---|---|
| JP | 2000-142044 A | 5/2000 |
| JP | 2002-321511 A | 11/2002 |
| JP | 2003-154825 A | 5/2003 |
| JP | 2004-082853 A | 3/2004 |
| JP | 2004-114898 A | 4/2004 |
| JP | 2005-349958 A | 12/2005 |
| JP | 3815305 B2 | 8/2006 |
| JP | 2008-184018 A | 8/2008 |

* cited by examiner

*Primary Examiner* — Lisa Caputo
*Assistant Examiner* — Jonathan Dunlap
(74) *Attorney, Agent, or Firm* — Carrier Blackman & Associates, P.C.; William D. Blackman; Joseph P. Carrier

(57) ABSTRACT

After the running wheels 12FR, 12FL, 12RR and 12RL are replaced from the summer wheel set to the winter wheel set (non-mounted wheels 12), when the vehicle 10 is running at a speed more than a predetermined speed, and if all ID numbers contained in the data received within a predetermined time are entirely identical to the sensor IDs corresponding to the non-mounted wheels 12, the sensor IDs identified in the sensor ID identification portion 54 are automatically switched from the sensor IDs corresponding to the summer wheel set to the sensor IDs of the winter wheel set.

5 Claims, 5 Drawing Sheets

TIRE PRESSURE MONITORING SYSTEM AND PRESSURE MONITORING UNIT

CROSS REFERENCE TO RELATED APPLICATIONS

This application claims the foreign priority benefit under Title 35, United States Code, §119(a)-(d) of Japanese Patent Application No. 2009-128293, filed on May 27, 2009, the contents of which are hereby incorporated by reference.

BACKGROUND OF THE INVENTION

1. Field of the Invention

The present invention relates to a tire pressure monitoring system and a pressure monitoring unit for monitoring an air pressure of a tire mounted on a wheel of, for example, a vehicle.

2. Description of Related Art

Installation of a tire pressure monitoring system (hereinafter, referred to as TPMS) which immediately notifies the driver in a running vehicle that a pressure of the tire is low, in a new vehicle is already a requirement in North America, and the TPMS is expected to be common in the other areas of the world. As a method for realizing the TPMS, there are two methods. One is a direct method (sensor method) which directly detects an air pressure using an air pressure sensor, and the other is an indirect method which indirectly detects the air pressure based on a difference of a rotation speed of a wheel. The TPMS in this specification is the direct method.

Generally, the TPMS consists of a pressure sensor unit mounted on each wheel, a monitoring unit mounted on a vehicle body and a display unit mounted on a part of an instrument panel. The pressure sensor unit mounted on the wheel includes at least an air pressure sensor and a wireless communication device, detects an air pressure in a tire and transmits data of the detected air pressure to the monitoring unit. The monitoring unit monitors data of the air pressure transmitted from each air pressure sensor unit, and if the air pressure is lowered less than a predetermined value, the monitoring unit transmits display data indicating the lowering of the tire pressure to the display unit.

Concerning this kind of TPMS, a tire pressure monitoring apparatus is disclosed in, for example, Japanese Patent No. 3815305, where when one running wheel of a vehicle is replaced with a spare wheel on which a spare tire is mounted, an identification number (hereinafter, referred to as ID number) of the wheel already being identified as a running wheel is compared with the ID number of the wheel included in a signal containing a rotation detection signal, and if both the ID numbers are not matched, the not-matched ID numbers are exchanged to each other, so that a switching of an identification of the ID number (hereinafter, referred to as ID number identification) of the running wheel can be automatically executed.

However, in the tire pressure monitoring apparatus disclosed in Japanese Patent No. 3815305, when a vehicle is running carrying a spare wheel on which a tire pressure sensor is mounted, a switch of a centrifugal force sensor which detects a rotation of a tire, of a pressure sensor unit fixed on the spare wheel may be turned on by vibrations due to, for example, a rough road, and thereby a signal including an ID number may be transmitted from the pressure sensor unit. Therefore, there is a possibility that the ID number of the running wheel is miss-identified.

In addition, in the tire pressure monitoring apparatus disclosed in Japanese Patent No. 3815305, one spare wheel is assumed as a non-mounted wheel which is different from a running wheel. Therefore, it is difficult to automatically switch the ID number identification of the running wheel in the case that four wheels, each mounting a normal tire, which are commonly used in the vehicle are all replaced with the wheels of a winter tire, such as a studless tire or a snow tire.

In addition, in the tire pressure monitoring apparatus disclosed in Japanese Patent No. 3815305, when the wheel is replaced, it is difficult to change a check threshold value for checking a lowering of the air pressure to be used for the monitoring unit, in response to a difference of a set pressure value in a tire of a wheel before and after the replacement of the wheel.

The present invention has been developed in consideration of the forgoing problems, and it is an object of the present invention to provide a tire pressure monitoring system which can automatically switch the ID number identification of the running wheel even in the case that all running wheels are replaced at the same time, while preventing the ID number (sensor ID) of the pressure sensor of the running wheel from miss-identifying, and in addition, can change the check threshold value for checking a lowering of the air pressure to be used for the monitoring unit in response to the set pressure value of a new running wheel after the replacement.

In addition, it is another object of the present invention to provide a pressure monitoring unit which prepares a plurality of mounting wheel sets on each of which the pressure sensor unit is mounted, which selects one set from the prepared plurality of the mounting wheel sets as a running wheel set, which selects later a set which is not selected and ready and waiting as a running wheel, which can replace a current running wheel set with another wheel set by the wheel set, and which can monitor the air pressure using the set pressure value of the wheel set to be mounted by the replacement of the wheel set.

SUMMARY OF THE INVENTION

The present invention has been developed for achieving the above objects, and according to a first aspect of the present invention, there is provided a tire pressure monitoring system which includes a pressure sensor unit which is mounted on a running wheel of a vehicle and provided with a pressure sensor for detecting a pressure of a tire of the running wheel and a centrifugal force sensor for detecting a centrifugal force due to rotation of the tire, and a pressure monitoring unit to which a data containing a detection value of the pressure sensor and an identification number which is uniquely assigned to the pressure sensor unit is transmitted if a detection value of the centrifugal force sensor becomes a predetermined value and over with a frequency higher than the frequency when the detection value of the centrifugal force sensor is less than the predetermined value, and which monitors a lowering of the pressure of the tire by comparing the detection value of the pressure sensor contained in the data with a predetermined check threshold value if an identification number of the received data is identical to the identification number of the pressure sensor unit mounted on the running wheel of the vehicle. A plurality of wheel sets each of which consists of a number of wheels identical to a number of the running wheels of the vehicle are prepared in the vehicle. The vehicle mounts one wheel set selected as the running wheels from the plurality of the wheel sets. The pressure monitoring unit stores the identification number of the pressure sensor unit mounted on each wheel included in the plurality of wheel sets by the wheel set and identifies the identification number corresponding to the selected one wheel set as the identification number of the pressure sensor unit mounted on the running wheel of the vehicle. When the vehicle is running at a predetermined speed and over and if the identification numbers contained in the data received within a predetermined time are identical to all identification numbers corresponding to another wheel set among the plurality of the wheel sets except for the one wheel set, the identification numbers corresponding to the another wheel set are newly identified as the identification numbers of the pressure sensor units mounted on the running wheels of the vehicle by replacing the identification numbers corresponding to the one wheel set.

According to the present invention, when the vehicle is running at the predetermined speed and over and if identification numbers (hereinafter, referred to as ID numbers) contained in the data received within a predetermined time are identical to all ID numbers corresponding to the another wheel set among the plurality of the wheel sets except for the one wheel set, the ID numbers corresponding to the another wheel set are newly identified as the ID numbers of the pressure sensor units mounted on the running wheels of the vehicle by replacing the ID numbers corresponding to the one wheel set.

Therefore, in the present invention, when the operator replaces one wheel set among the plurality of the wheel sets prepared in advance with another wheel set (for example, when a summer wheel set is replaced with a winter wheel set by the wheel set), an identification of the ID number (sensor ID) (hereinafter, referred to as ID number identification) of the pressure sensor unit of the running wheel is automatically switched. Accordingly, a switching operation of the ID number (sensor ID) identification of the running wheel is unnecessary when the wheel set is replaced. As a result, in the present invention, a workload of switching operation for switching the ID number (sensor ID) being identified for the pressure monitoring unit, which is conducted by the operator, can be omitted when the wheel set is replaced.

In addition, in the present invention, the pressure monitoring unit stores a set pressure value of a wheel included in the plurality of wheel sets by the wheel set, sets the set pressure value corresponding to the one wheel set as the check threshold value, and when the identification number being identified as the identification number of the pressure sensor unit mounted on the running wheel of the vehicle is replaced from the identification number corresponding to the one wheel set to the identification number corresponding to the another wheel set, the set pressure value corresponding to the another wheel set is set as the predetermined check threshold value by replacing the set pressure value corresponding to the one wheel set.

According to the present invention, the check threshold value is switched in accordance with the replacement of the wheel set. Therefore, for example, a difference of the set pressure values between a summer tire and a winter tire does not cause any problem and a change of the set pressure value due to a change to a wheel having an enlarged diameter does not cause any problem too.

In addition, according to the present invention, when identification numbers contained in the data received within the predetermined time are identical to the identification numbers ranging and corresponding to different wheel sets of the plurality of the wheel sets, the identification number being identified as the identification number of the pressure sensor unit mounted on the running wheel of the vehicle is not replaced.

According to the present invention, when the vehicle is running, for example, on a rough road, if the centrifugal force sensor of the pressure sensor unit mounted on the non-mounted wheel which is carried on the vehicle but not mounted as the running wheel is activated, and if data containing the ID number of the pressure sensor unit is transmitted, the ID number (sensor ID) of the one wheel set and the ID number of the other wheel sets are received in mixture. In this case, the ID number (sensor ID) being identified is prevented from switching. Accordingly, the ID number (sensor ID) of the running wheel can be prevented from miss-identifying through the automatic switching.

Furthermore, according to the present invention, there is provided a pressure monitoring unit which is applied to a vehicle in which a plurality of wheel sets on each of whose wheels a pressure sensor unit is fixed are prepared as mounting wheel sets, a predetermined one set among the prepared plurality of the mounting wheel sets is selected and mounted as a running wheel set, and a non-selected mounting wheel set which is ready and waiting is selected and mounted later as the running wheel set by replacing the running wheel set currently mounted by the wheel set. The pressure monitoring unit configures a tire pressure monitoring system together with the pressure sensor unit, and includes a storage which has an information list of identification numbers indicating a correspondence between the identification numbers of the pressure sensor units fixed on the wheels and the mounting wheel sets of the vehicle, current mounting information indicating the mounting wheel set which is currently mounted as the running wheel set, and set pressure value information indicating a correspondence between set pressure values and monitoring wheel sets, as well as a controller which monitors the pressure using pieces of the information stored in the storage and the pressure data which is transmitted by the pressure sensor unit fixed on the running wheel and contains the pressure of the running wheel and the identification number of the pressure sensor unit. When a number of identification numbers identical to the identification numbers of the information list as many as a number of running wheels mounted on the vehicle are read out within a predetermined time except for the duplication, the controller updates the current mounting information in the storage using the read out identification numbers and executes a pressure monitoring processing using the set pressure value of each running wheel which is determined from the set pressure value information in the storage and the updated current mounting information.

According to the present invention, the pressure monitoring unit is applied to a vehicle, where a plurality of sets of a wheel on which a pressure sensor unit is fixed are prepared as mounting wheel sets, a predetermined one set among the prepared plurality of the mounting wheel sets is selected and mounted as a running wheel set, and a non-selected mounting wheel set which is ready and waiting is selected and mounted later as the running wheel set by replacing the running wheel set currently mounted by the wheel set.

The pressure monitoring unit can update the current mounting information of the running wheel by the wheel set using the ID number acquired during the running, and can monitor the pressure of the running wheel using the set pressure value which is determined based on the set pressure value information by the wheel set stored in advance in the storage and the updated current mounting information by the wheel set.

According to the present invention, there is provided a tire pressure monitoring system which can prevent the ID number (sensor ID) of the pressure sensor unit of the running wheel from miss-identifying, can automatically switch the ID number (sensor ID) identification of the running wheel even in the case that all the running wheels are replaced at the same time, and in addition, can change the check threshold value for checking the lowering of the pressure of the tire in accordance with the set pressure value of the wheel after the replacement.

In addition, according to the present invention, there is provided a pressure monitoring unit which selects later the non-selected mounting wheel set which is ready and waiting as the running wheel set, can automatically switch the ID number (sensor ID) identification of the running wheel even in the case that the non-selected mounting wheel set is replaced with the currently mounted wheel set, and can monitor the pressure of the tire using the set pressure value of the wheel set to be mounted by the replacement.

DETAILED DESCRIPTION OF THE PREFERRED EMBODIMENT

Figure 1:
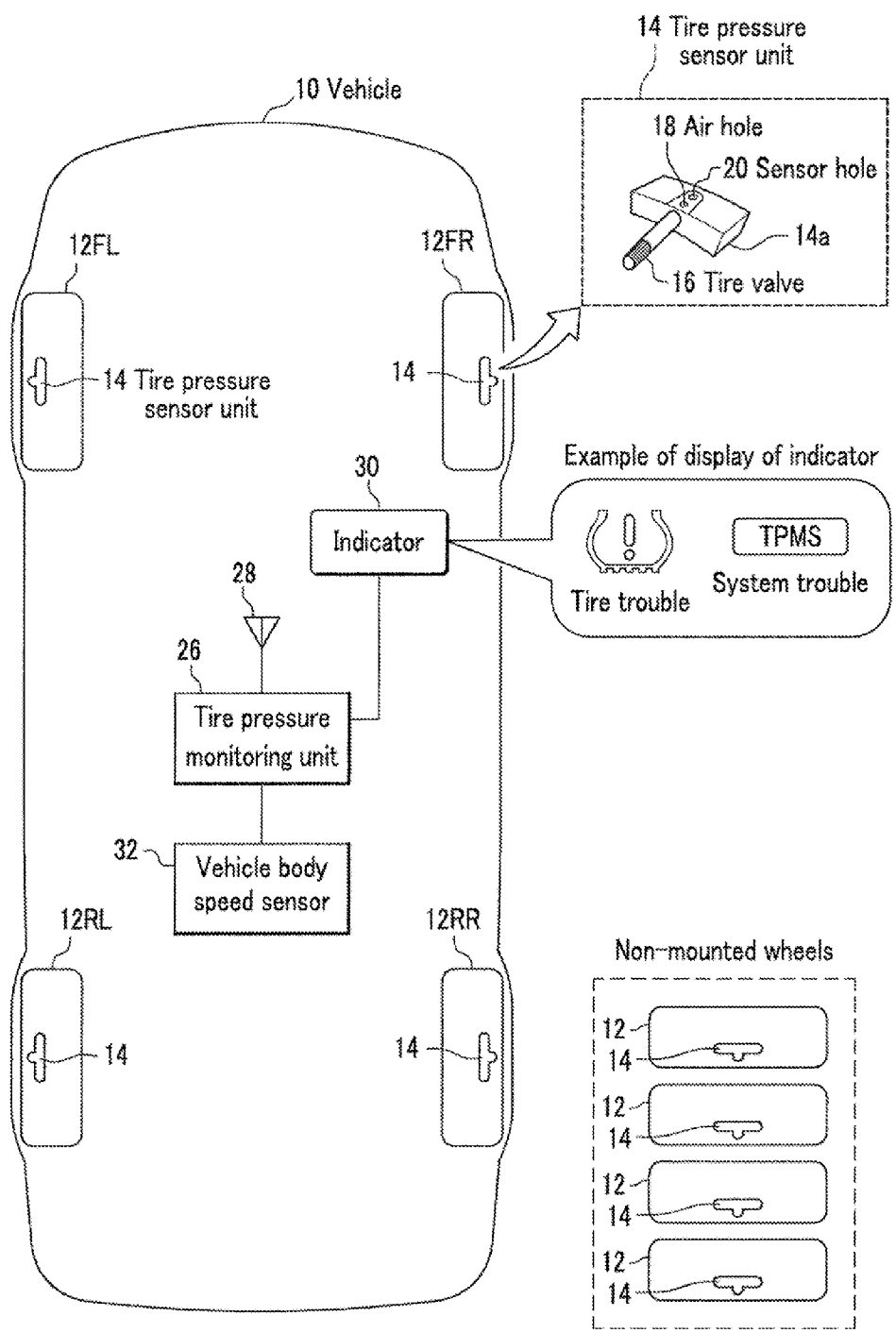
FIG. 1 is a system configuration of a vehicle in which a tire pressure monitoring system according an embodiment of the present invention is installed.
Figure 2:
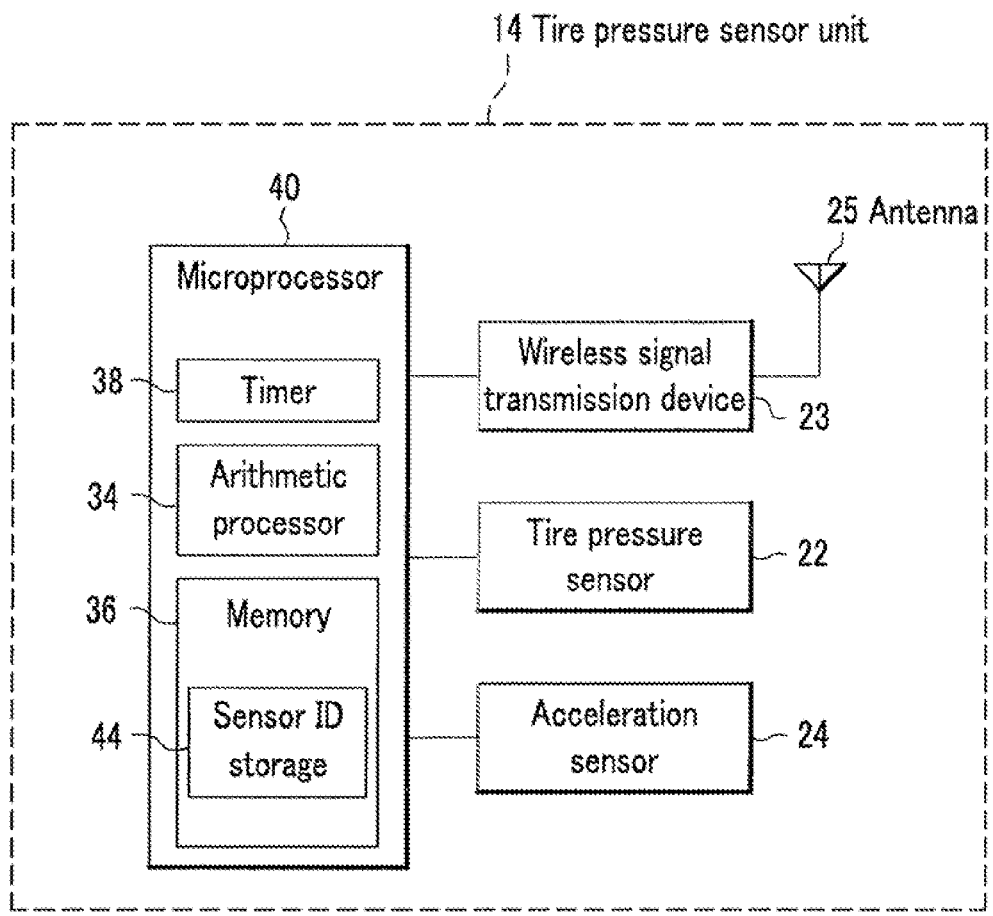
FIG. 2 is a block diagram of a tire pressure sensor unit configuring the tire pressure monitoring system.

Next, an embodiment of the present invention will be explained in detail by referring to drawings as appropriate. FIG. 1 is a system configuration of a vehicle in which a tire pressure monitoring system according an embodiment of the present invention is installed, and FIG. 2 is a block diagram of a tire pressure sensor unit configuring the tire pressure monitoring system.

In FIG. 1, a vehicle body front of a vehicle 10 is arranged on the upper side in the figure, and the vehicle 10 is provided with four running wheels consisting of a front-right wheel 12FR, a front-left wheel 12FL, a rear-right wheel 12RR and a rear-left wheel 12RL. The each of the wheels 12FR, 12FL, 12RR and 12RL includes a vehicle wheel and a tire mounted on the vehicle wheel. A tire of each of the wheels 12FR, 12FL, 12RR and 12RL is, for example, a normal tire which is used in normal conditions, and a tire pressure sensor unit (air pressure sensor unit) 14 is disposed in each of the wheels 12FR, 12FL, 12RR and 12RL. In this case, one predetermined set among a plurality of mounting wheel sets which are prepared in advance is selected and mounted as a running wheel set.

Meanwhile, four non-mounted wheels 12 which are not mounted on the vehicle 10 are prepared separately, and the four non-mounted wheels 12 function as a set (one set) of a mounting wheel which is not selected and ready and waiting. The non-mounted wheels 12 includes a vehicle wheel and a tire mounted on the vehicle wheel as with the forgoing mounting wheels 12FR, 12FL, 12RR and 12RL, and the tire is a winter tire such as a studless tire or a snow tire. All the non-mounted wheels 12 are provided with a tire pressure sensor unit 14, respectively.

The tire pressure sensor unit 14 includes a casing 14a which is a plate body having a flat and substantially rectangular shape as shown in the right upper portion of FIG. 1, and on the bottom surface of the casing 14a, has a curved surface to be fixed on a rim surface inside of each of the wheels 12FR, 12FL, 12RR, 12RL and 12. In addition, on the upper surface of the casing 14a, an air hole 18 which is directly connected to a tire valve 16 and a sensor hole 20 communicated with a sensor arrangement space formed by the casing 14a are disposed, respectively.

In this case, as shown in FIG. 2, the tire pressure sensor unit 14 is provided with a tire pressure sensor (air pressure sensor) 22 and an acceleration sensor 24 in the sensor arrangement space, so as to detect an air pressure and an acceleration in the tire of each of the wheels 12FR, 12FL, 12RR, 12RL and 12 and transmit the detected data to the outside through a wireless signal transmission device 23 and an antenna 25. In this embodiment, the acceleration sensor 24 consists of a centrifugal force sensor.

Returning to FIG. 1, a tire pressure monitoring unit (air pressure monitoring unit) 26 is installed on the vehicle 10, and the tire pressure monitoring unit 26 receives a wireless signal transmitted from the tire pressure sensor unit 14 mounted on each of the wheels 12FR, 12FL, 12RR, 12RL and 12 through the antenna 28, and acquires tire pressure data detected by the tire pressure sensor 22 and acceleration data detected by the acceleration sensor 24.

The tire pressure monitoring unit 26 detects a lowering of a tire pressure by comparing the acquired tire pressure data with a threshold value which is set in advance, and if the lowering of the tire pressure is detected, the detection of the lowering of the tire pressure is displayed on an indicator 30 of a display unit which is disposed on an instrument panel.

In addition, a vehicle body speed sensor 32 is connected to the tire pressure monitoring unit 26, and a vehicle body speed can be acquired through the vehicle body speed sensor 32. Meanwhile, for example, a rotation speed of a drive shaft disposed at an output side of a transmission, which is not shown, may be used as the vehicle body speed data. In addition, a wheel speed sensor, not shown, disposed in each of the wheels 12FR, 12FL, 12RR, 12RL and 12 for ABS (Antilock Brake System) may be used as the vehicle speed sensor 32.

Next, a configuration of the tire pressure sensor unit 14 will be explained based on FIG. 2.

The tire pressure sensor unit 14 includes a microprocessor 40 having an arithmetic processor 34, a memory 36 and a timer 38, and equipment such as the wireless signal transmission device 23 and the antenna 25, as well as sensors such as the tire pressure sensor 22 and the acceleration sensor 24 are electrically connected to the microprocessor 40.

The memory 36 generally consists of a RAM (Random Access Memory) and a ROM (Read Only Memory). A sensor ID storage 44 is secured in a part of the ROM, and a sensor ID for identifying each of a plurality of tire pressure sensor units 14 is stored in the sensor ID storage 44.

The microprocessor 40 is activated, for example, every ten seconds by the timer 38 and acquires various kinds of data such as tire pressure data and acceleration data detected by the sensors such as the tire pressure sensor 22 and the acceleration sensor 24.

Figure 3:
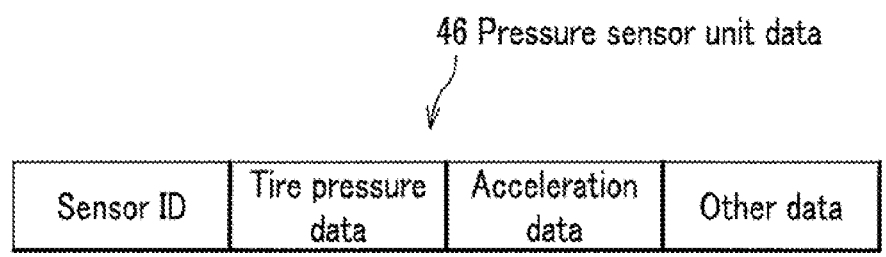
FIG. 3 is an illustration for explaining data configuration of a wireless signal transmitted by a tire pressure sensor unit.

FIG. 3 is an illustration for explaining data configuration of a wireless signal transmitted by a tire pressure sensor unit.

The microprocessor 40 assigns a sensor ID (unique identification number) read out from the sensor ID storage 44 to various kinds of data such as these acquired tire pressure data and the acceleration data, prepares pressure sensor unit data 46, for example, as shown in FIG. 3, and transmits the prepared pressure sensor unit data 46 to the outside of the tire pressure sensor unit 14 through the wireless signal transmission device 23 and the antenna 25.

Figure 4:
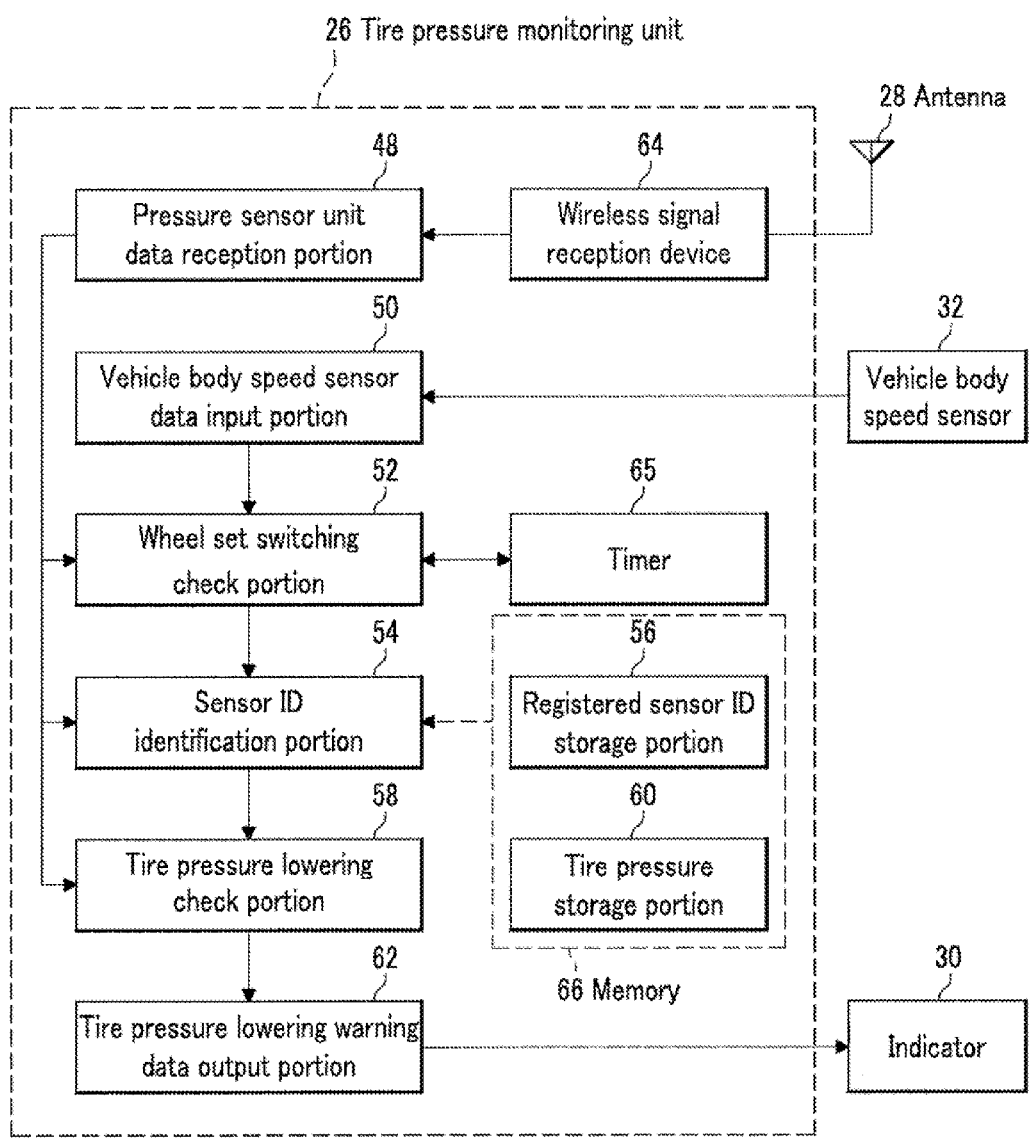
FIG. 4 is a block diagram of a tire pressure monitoring unit configuring a tire pressure monitoring system.

FIG. 4 is a block diagram of a tire pressure monitoring unit configuring a tire pressure monitoring system.

As shown in FIG. 4, the tire pressure monitoring unit 26 includes a pressure sensor unit data reception portion 48, a vehicle body speed sensor data input portion 50, a wheel set switching check portion 52, a sensor ID identification portion 54, a registered sensor ID storage portion 56, a tire pressure lowering check portion 58, a tire pressure storage portion 60, a tire pressure lowering warning data output portion 62, a wireless signal reception device 64 and a timer 65. The timer 65 is connected to the wheel set switching check portion 52, and a timer count can be activated (started), stopped and restarted by the wheel set switching check portion 52.

In this case, constituents of the tire pressure monitoring unit 26 except for the wireless signal reception device 64 are configured with a computer consisting of an arithmetic processor, not shown, and a memory 66. Namely, the registered sensor ID storage portion 56 and the tire pressure storage portion 60 are configured with a part of the memory 66, and the pressure sensor unit data reception portion 48, the vehicle body speed sensor data input portion 50, the wheel set switching check portion 52, the sensor ID identification portion 54, the tire pressure lowering check portion 58 and the tire pressure lowering warning data output portion 62 are realized by executing respective predetermined programs (not shown) stored in the memory 66. It is noted that in the tire pressure monitoring unit 26, the memory 66 and the sensor ID identification portion 54 function as a storage portion, and constituents of the tire pressure monitoring unit 26 except for the memory 66 and the sensor ID identification portion 54 function as a control portion.

Figure 5:
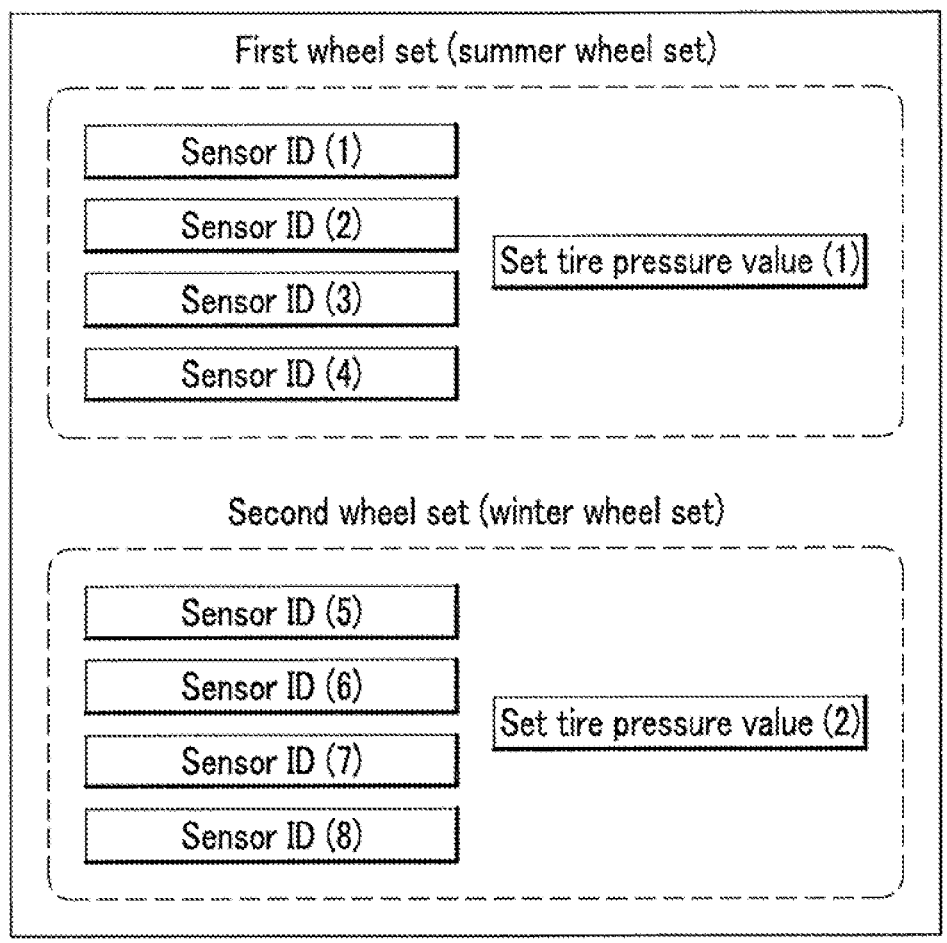
FIG. 5 is a block diagram showing an example of data stored in a memory portion of a tire pressure monitoring unit.

FIG. 5 is a block diagram showing an example of data stored in a memory portion of a tire pressure monitoring unit.

Data information of each of a plurality of wheel sets is stored in the memory 66 which includes the registered sensor ID storage portion 56 and the tire pressure storage portion 60. Namely, as shown in FIG. 5, an ID group (current mounting information by wheel set) consisting of a sensor ID (1), a sensor ID (2), a sensor ID (3) and a sensor ID (4) in each of the four wheels 12FR, 12FL, 12RR and 12RL mounted on a vehicle, and a set tire pressure value (1) which is a set value of a tire pressure in the four wheels 12FR, 12FL, 12RR and 12RL are stored (registered) in the memory 66 in advance as a first wheel set. The first wheel set consists of, for example, four normal tires mounted on respective vehicle wheels, and hereinafter, the first wheel set is called a summer wheel set.

In addition, an ID group consisting of a sensor ID (5), a sensor ID (6), a sensor ID (7) and a sensor ID (8) in each of four wheels 12 which are not mounted on the vehicle, and a set tire pressure value (2) which is a set value of a tire pressure in the four wheels 12 are stored as a second wheel set. The second wheel set consists of, for example, four studless tires or four snow tires mounted on respective vehicle wheels, and hereinafter, the second wheel set is called a winter wheel set.

In this case, the set tire pressure value (1) and the set tire pressure value (2) are set in respective wheel sets by the wheel set and function as the set pressure information of each wheel set, but not set in an individual wheel. In addition, in FIG. 5, a combination of the sensor ID group consisting of the sensor ID (1), the sensor ID (2), the sensor ID (3) and the sensor ID (4) and the sensor ID group consisting of the sensor ID (5), the sensor ID (6), the sensor ID (7) and the sensor ID (8) functions as an information list of an identification number (hereinafter, referred to as ID number).

It is noted that, in the embodiment, the explanation will be made by exemplifying two wheel sets consisting of the summer wheel set and the winter wheel set. However, the present invention is not limited to the embodiment and more than two wheel sets each of which consisting of a number of wheel identical to a number of running wheel of the vehicle 10 may be stored in advance. In addition, a storing operation (registering operation) of a sensor ID by the wheel set is conducted using a specific tool (sensor forced data transmission tool) by, for example, a dealer when the vehicle is sold.

The vehicle 10 in which the tire pressure monitoring system according to the embodiment is installed is basically configured as described above, and operations and effects thereof will be explained next in reference to a flowchart shown in FIG. 6.

In the embodiment, first, as the running wheels 12FR, 12FL, 12RR and 12RL mounted on the vehicle 10, a summer wheel set including four tires is mounted on the vehicle 10, and hereinafter, the case that the summer wheel set is replaced with a winter wheel set will be explained. In addition, it is assumed that a sensor ID group of the summer wheel set which includes the sensor ID (1), the sensor ID (2), the sensor ID (3) and the sensor ID (4) and the set tire pressure value (1) are being identified in the sensor ID identification portion 54.

In other words, the tire pressure monitoring unit 26 stores a sensor ID (identification number) of the tire pressure sensor unit 14 mounted on each wheel which is included in a plurality of wheel sets by the wheel set, and identifies a sensor ID (sensor ID (1), sensor ID (2), sensor ID (3) and sensor ID (4)) corresponding to the selected one wheel set (summer wheel set) as the sensor ID of the tire pressure sensor unit 14 mounted on the running wheels 12FR, 12FL, 12RR and 12RL of the vehicle 10.

In step S1, after the timer 65 which is disposed in the tire pressure monitoring unit 26 started counting, a normal tire pressure monitoring processing (normal monitoring processing) is executed (see step 2). Below, the normal tire pressure monitoring processing which detects a pressure lowering of a tire and displays the pressure lowering on the indicator 30 will be explained briefly.

When the vehicle 10 runs and the wheels 12FR, 12FL, 12RR and 12RL start to rotate, an acceleration is generated in the acceleration sensor (centrifugal force sensor) 24 of the tire pressure sensor unit 14 mounted on each of the wheels 12FR, 12FL, 12RR and 12RL due to a centrifugal force given by the rotation. In this case, there is a proportional relation between a running speed (vehicle body speed) of the vehicle 10 and an acceleration of the centrifugal force due to the rotation of the tire. When a detection value of the acceleration sensor 24 that detected the acceleration becomes a predetermined value and over, the tire pressure sensor unit 14 transmits pressure sensor unit data 46 containing, for example, tire pressure data detected by the tire pressure sensor 22, acceleration data and sensor ID to the tire pressure monitoring unit 26. Meanwhile, when the detection value of the acceleration sensor 24 is less than the predetermined value, no date is transmitted from the tire pressure sensor unit 14.

If the detection value of the acceleration sensor 24 is the predetermined value and over, a transmission from the tire pressure sensor unit 14 is conducted more frequently in comparison with the case that the detection value of the acceleration sensor 24 is less than the predetermined value. In this case, for example, the predetermined value means an acceleration (G) corresponding to the vehicle body speed 22-23 km/h, and if an acceleration becomes the predetermined value and over, the transmission is conducted at a high rate of, for example, once per minute. On the other hand, if the acceleration is less than the predetermined value, no transmission is conducted, or a low rate transmission, for example, once per hour is conducted.

The pressure sensor unit data reception portion 48 of the tire pressure monitoring unit 26 receives the pressure sensor unit data 46 transmitted from the tire pressure sensor unit 14 through the antenna 28 and the wireless signal reception device 64. As shown in FIG. 3, the pressure sensor unit data 46 contains the tire pressure data and the acceleration data, and a sensor ID (identification number) indicating the tire pressure sensor unit 14 which transmitted the pressure sensor unit data 46. Subsequently, the vehicle body speed sensor data input portion 50 inputs vehicle body speed data detected by the vehicle body speed sensor 32 at the moment.

Meanwhile, the tire pressure lowering check portion 58 compares a sensor ID contained in the received pressure sensor unit date 46 with a sensor ID in the sensor ID identification portion 54 to check whether or not a sensor ID of the tire pressure sensor unit 14 mounted on the running wheel of the vehicle 10 is identical to the sensor ID in the sensor ID identification portion 54. If both the sensor ID match each other, the tire pressure lowering check portion 58 compares tire pressure data contained in the pressure sensor unit data 46 with a set tire pressure value (predetermined check threshold value) in the sensor ID identification portion 54, and checks whether or not the tire pressure is lowered.

In the process described above, if it is determined that the received tire pressure is smaller than the set tire pressure value which is set in advance, the tire pressure lowering warning data output portion 62 outputs tire pressure lowering warning data to the indicator 30. On the other hand, if the received tire pressure is not lowered from the set tire pressure value which is set in advance, the tire pressure lowering warning data output portion 62 continues the normal tire pressure monitoring processing (normal monitoring processing of the tire pressure).

An example of display for the tire pressure lowering warning on the indicator 30 is shown in FIG. 1. For example, when the tire pressure lowering warning is output to any one of the running wheels 12FR, 12FL, 12RR, and 12RL, an icon showing a tire trouble is turned on. Meanwhile, if a trouble occurs in the TPMS, an icon showing a system trouble is turned on.

During executing the normal tire pressure monitoring processing as described above, in step S3, the pressure sensor unit data reception portion 48 checks whether or not a sensor ID of the non-mounted wheel 12 is received, and if the sensor ID (sensor ID (5), sensor ID (6), sensor ID (7) and sensor ID (8)) of the non-mounted wheel 12 is received (step S3→Yes), the step proceeds to step S4, and if the sensor ID of the non-mounted wheel 12 is not received (step S3→No), the step returns to step S2 where the normal tire pressure monitoring processing is executed.

In step S4, the wheel set switching check portion 52 checks whether or not the vehicle body speed detected by the vehicle body speed sensor 32 is a predetermined speed (for example, 40 km/h) and over, and if the vehicle body speed is 40 km/h and over (step S4→Yes), the step proceeds to step S5, and if the vehicle body speed is less than 40 km/h (step S4→No), the step returns to step S2 where the normal tire pressure monitoring processing is executed. The predetermined speed of the vehicle body speed is set to a value (for example, 40 km/h) which is higher than a vehicle speed (for example, about 22-23 km/h) with which the tire pressure sensor unit 14 determines that the vehicle is running based on a detection value of the acceleration sensor 24 and transmits data. The little higher value (40 km/h) is set so that a switching of the wheel set, described later, is conducted under the condition that the transmission started with sure high frequency, because the tire pressure sensor unit 14 does not transmit data with high frequency when the vehicle 10 is parked or running at a low speed.

Next, in step S5, an incremental processing (T=T+1) of a timer count in the timer 65 which started in step S1 is executed. In addition, in step S6, the wheel set switching check portion 52 checks whether or not the timer count has elapsed a predetermined T minutes. In the embodiment, the predetermined T minutes is set to, for example, 19 minutes.

If the timer count has not elapsed the predetermined T minutes (step S6→No), in step S7, the wheel set switching check portion 52 further checks whether or not both the sensor ID (sensor ID (1), sensor ID (2), sensor ID (3) and sensor ID (4)) of the first wheel set that is a summer wheel set and the sensor ID (sensor ID (5), sensor ID (6), sensor ID (7) and sensor ID (8)) of the second wheel set that is a winter wheel set are received.

If the received sensor ID is only the sensor ID of the first wheel set for summer, or only the sensor ID of the second wheel set for winter (step S7→No), the step returns to step S2. On the other hand, if at least one sensor ID of the first wheel set that is the summer wheel set and at least one sensor ID of the second wheel set that is the winter wheel set are received (step S7→Yes), the timer 65 is reset (step S8) and the step returns to step S2.

If the timer count elapsed the predetermined T minutes (step S6→Yes) in step S6, the wheel set switching check portion 52 checks in step S9 whether or not all sensor ID (sensor ID (5), sensor ID (6), sensor ID (7) and sensor ID (8)) of the winter wheel set, that is, the non-mounted wheels 12 are received.

If the wheel set switching check portion 52 determined in step S9 that all the sensor ID (sensor ID (5), sensor ID (6), sensor ID (7) and sensor ID (8)) of the winter wheel set, that is, the non-mounted wheels 12 were received (step S9→Yes), the wheel set switching check portion 52 outputs a wheel set switching signal to the sensor ID identification portion 54, and a sensor ID and a set tire pressure value which are being identified in the sensor ID identification portion 54 are replaced from those of the summer wheel set to those of the winter wheel set (step S10). This is such a processing that when a number of identification numbers (sensor ID) identical to the identification numbers (sensor ID) of the information list (see FIG. 5) as many as a number of running wheels mounted on the vehicle are read out within a predetermined time except for the duplication, information of currently mounted wheel set in a storage (sensor ID identification portion 54) is updated using the read out identification numbers (sensor ID).

Therefore, a sensor ID and a set tire pressure value to be used as the comparative object by the tire pressure lowering check portion 58 of the tire pressure monitoring unit 26 after the switching is automatically switched from the sensor ID (sensor ID (1), sensor ID (2), sensor ID (3) and sensor ID (4)) and the set tire pressure value (1) of the former first wheel set that is the summer wheel set to the sensor ID (sensor ID (5), sensor ID (6), sensor ID (7) and sensor ID (8)) and the set tire pressure value (2) of the second wheel set that is the winter wheel set. After a sensor ID is switched by the wheel set, the timer 65 is reset (step S11) and the step returns to step S2.

In other words, when a sensor ID (identification number) corresponding to the summer wheel set that is one wheel set is replaced (updated) with a sensor ID (identification number) corresponding to the winter wheel set that is another wheel set, the set tire pressure value (2) (set air pressure) corresponding to the winter wheel set becomes a predetermined check threshold value in the tire pressure lowering check portion 58, by replacing the set tire pressure value (1) (set air pressure) corresponding to the summer wheel set.

This means that the tire pressure monitoring unit 26 monitors an air pressure of the running wheel using a set pressure value of each running wheel which is the updated current mounting information by the wheel set in the storage (sensor ID identification portion 54).

In the embodiment, the automatic switching of the sensor ID being identified is executed only in the case that a vehicle body speed of the vehicle 10 becomes a predetermined speed and more as shown in step S4. However, even if the vehicle body speed temporarily becomes less than the predetermined speed, the timer count is maintained as it is as long as the flow does not pass the step (see, for example, step S8, S11, S12) of the timer reset.

For example, in a loop repeating step S2→step S3→step S4→step S5→step S6→step S7→step S2, even if a vehicle body speed of the vehicle 10 temporarily becomes less than a predetermined speed and the flow passes a loop step S2→step S3→step S4→step S2, the timer count is not reset and maintained as before, and after the body speed returned to the predetermined speed and over, the incremental processing (T=T+1) starts again.

On the other hand, when the wheel set switching check portion 52 determined in step S9 that any one of the sensor ID (sensor ID (5), sensor ID (6), sensor ID (7) and sensor ID (8)) of the winter wheel set that is the non-mounted wheel 12 was not received (all sensor IDs of the winter wheel set were not received) (step S9→No), the wheel set switching check portion 52 does not switch the sensor ID by the wheel set (does not output a wheel set switching signal to the sensor ID identification portion 54) and resets (step S12) the timer 65, then, the step returns to step S2.

In the embodiment, when an operator replaces one wheel set (summer wheel set) of the running wheels 12FR, 12FL, 12RR and 12RL among a plurality of wheel sets prepared in advance with another wheel set (winter wheel set), the sensor IDs identified in the sensor ID identification portion 54 are automatically switched. As a result, in the embodiment, when a wheel set is replaced, a workload of the operator for switching the sensor IDs being identified in the sensor ID identification portion 54 can be cut, and a workload for switching a set pressure value can also be cut.

In addition, in the embodiment, a set tire pressure value can be automatically switched in accordance with the replacement of the wheel set. Therefore, for example, a difference of the set air pressure between a summer tire and a winter tire does not cause any problem and a change of the set air pressure due to a change to wheel whose diameter is enlarged does not cause any problem too.

In addition, in the embodiment, when the vehicle 10 is running, mounting one of the summer wheel set and the winter wheel set on the wheels 12FR, 12FL, 12RR and 12RL of the vehicle 10 and carrying the other wheel set, for example, in the trunk of the vehicle 10, the acceleration sensor 24 of the tire pressure sensor unit 14 of the other wheel set may be activated by vibrations due to, for example, a rough road, and the pressure sensor unit data 46 containing a sensor ID may also be transmitted from this tire pressure sensor unit 14. However, as shown in step S7 in FIG. 6, even in this case, when both the sensor ID of the summer wheel set and the sensor ID of the winter wheel set are received in mixture, a sensor ID being identified as the sensor ID of the running wheel is prevented from switching. As a result, a miss-identification of the sensor ID of the running wheel by the automatic switching of the sensor ID can be prevented.

Figure 6:
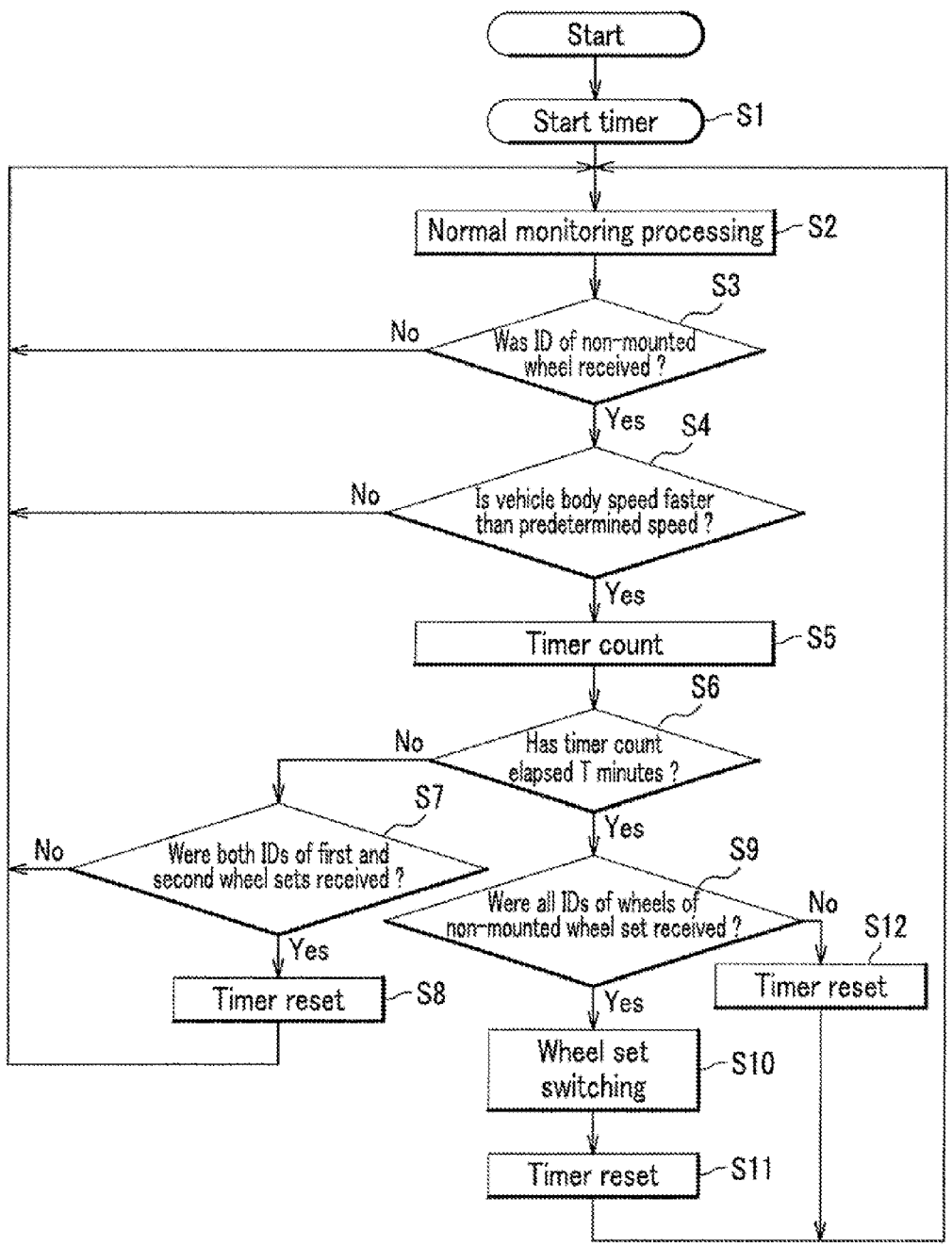
FIG. 6 is a flowchart showing a flow of an automatic switching of a sensor ID of a tire pressure sensor unit accompanying a replacement of a wheel set.

Similarly, for example, in a case of a transmission failure of the tire pressure sensor unit 14 and in a case of a reception failure of the tire pressure monitoring unit 26, as shown in step S9 in FIG. 6, if all sensor IDs of the winter wheel set consisting of four wheels are not received, the identified sensor ID is prevented from switching. As a result, a miss-identification of the sensor ID of the running wheel through the automatic switching of the sensor ID can be prevented.

As described above, in the embodiment, the automatic switching of the sensor ID of the wheel set is not executed unless the condition for switching the wheel set is satisfied completely. As a result, a miss-identification of the sensor ID of the running wheel through the automatic switching of the sensor ID can be perfectly prevented.

Furthermore, in the embodiment, the wheel set switching check portion 52 executes a checking processing which wheel set is mounted on the vehicle 10 only when the vehicle body speed becomes a predetermined speed and over based on the vehicle body speed sensor data detected by the vehicle body speed sensor 32. Namely, in the embodiment, the predetermined speed of the vehicle body speed is set to a value (for example, 40 km/h) higher than a vehicle speed (for example, 22-23 km/h) with which the tire pressure sensor unit 14 determines that the vehicle is running from a detection value of the acceleration sensor 24 and transmits data. As a result, a control of the automatic switching of the wheel set can be conducted under the condition that the data transmission started with sure high frequency.

Accordingly, in the embodiment, there is provided a tire pressure monitoring system which can prevent an ID number (sensor ID) of the tire pressure sensor unit 14 of the running wheel from miss-identifying, which can automatically switch the ID number (sensor ID) identification of the running wheel even in the case that the non-selected mounting wheel set is replaced with the currently mounted wheel set, and further, which can change a set check threshold value for checking a lowering of a tire pressure in accordance with a set value of the wheel set after replacing.

Meanwhile, in the embodiment, the replacement of the wheel set from the summer wheel set to the winter wheel set has been exemplified. However, the present invention is not limited to this, and can also be applied to the replacement of the wheel set from the winter wheel set to the summer wheel set. Furthermore, the present invention can also be preferably applied to the case that prepares three and more wheel sets in advance and replaces the currently mounted wheel set with one of the three and more wheel sets.

Meanwhile, in the embodiment, the explanation has been made assuming that the tire pressure sensor unit 14 is mounted on a vehicle wheel of each of the wheels 12FR, 12FL, 12RR, 12RL and 12. However, the present invention is not limited to this, and the tire pressure sensor unit 14 may be fixed inside a tire mounted on the vehicle wheel.

In addition, in the embodiment, an activation of a wheel set switching mode (see steps S3, S4, S5, S6, S9, S10 and S11 in FIG. 6) is triggered (see step S3 in FIG. 6) by a reception of a sensor ID of the non-mounted wheels 12 at the pressure sensor unit data reception portion 48 (see FIG. 3). However, instead of the step S3, for example, merely a turn-ON of the ignition switch may be a trigger for moving to the wheel set switching mode.

Furthermore, in the embodiment, the predetermined T minutes of the timer count in step S6 in FIG. 6 was set to, for example, 19 minutes. However, the predetermined T minutes are not limited to 19 minutes. For example, when a transmission interval of the pressure sensor unit data 46 from the tire pressure sensor unit 14 is short, the predetermined T minutes may be set to be shorter than 19 minutes. On the other hand, when the transmission interval is long, the predetermined T minutes may be set to be longer than 19 minutes. The predetermined T minutes is set as appropriate according to the purpose and application. In the embodiment, a target time until a sensor ID of the running wheel being identified in the sensor ID identification portion 54 is switched to a sensor ID of the replaced wheel set is set to 20 minutes in the flowchart shown in FIG. 6. Therefore, the 19 minutes which is shorter than 20 minutes was set as the predetermined T minutes.

What is claimed is:

1. A tire pressure monitoring system, comprising:
a pressure sensor unit which is mounted on a running wheel of a vehicle and provided with a pressure sensor for detecting a pressure of a tire of the running wheel and a centrifugal force sensor for detecting a centrifugal force due to rotation of the tire; and
a pressure monitoring unit to which a data containing a detection value of the pressure sensor and an identification number which is uniquely assigned to the pressure sensor unit is transmitted if a detection value of the centrifugal force sensor becomes a predetermined value and over with a frequency higher than the frequency when the detection value of the centrifugal force sensor is less than the predetermined value, and which monitors a lowering of the pressure of the tire by comparing the detection value of the pressure sensor contained in the data with a predetermined check threshold value if an identification number of the received data is identical to the identification number of the pressure sensor unit mounted on the running wheel of the vehicle,
wherein a plurality of wheel sets each of which consists of a number of wheels identical to a number of the running wheels of the vehicle are prepared in the vehicle;
wherein the vehicle mounts one wheel set selected as the running wheels from the plurality of the wheel sets; and
wherein the pressure monitoring unit stores the identification number of the pressure sensor unit mounted on each wheel included in the plurality of wheel sets by the wheel set and identifies the identification number corresponding to the selected one wheel set as the identification number of the pressure sensor unit mounted on the running wheel of the vehicle,
wherein when the vehicle is running at a predetermined speed and over and if the identification numbers contained in the data received within a predetermined time are identical to all identification numbers corresponding to another wheel set among the plurality of the wheel sets except for the one wheel set, the identification numbers corresponding to the another wheel set are newly identified as the identification numbers of the pressure sensor units mounted on the running wheels of the vehicle by replacing the identification numbers corresponding to the one wheel set.

2. The tire pressure monitoring system according to claim 1,
wherein the pressure monitoring unit stores a set pressure value of a wheel included in the plurality of wheel sets by the wheel set;
wherein the set pressure value corresponding to the one wheel set is set as the check threshold value;
wherein when the identification number being identified as the identification number of the pressure sensor unit mounted on the running wheel of the vehicle is replaced from the identification number corresponding to the one wheel set to the identification number corresponding to the another wheel set, the set pressure value corresponding to the another wheel set is set as the predetermined check threshold value by replacing the set pressure value corresponding to the one wheel set.

3. The tire pressure monitoring system according to claim 1,
wherein if identification numbers contained in the data received within the predetermined time are identical to the identification numbers ranging and corresponding to different wheel sets of the plurality of the wheel sets, the identification number being identified as the identification number of the pressure sensor unit mounted on the running wheel of the vehicle is not replaced.

4. The tire pressure monitoring system according to claim 2,
wherein if identification numbers contained in the data received within the predetermined time are identical to the identification numbers ranging and corresponding to different wheel sets of the plurality of the wheel sets, the identification number being identified as the identification number of the pressure sensor unit mounted on the running wheel of the vehicle is not replaced.

5. A pressure monitoring unit which is applied to a vehicle in which a plurality of wheel sets on each of whose wheels a pressure sensor unit is fixed are prepared as mounting wheel sets, a predetermined one set among the prepared plurality of the mounting wheel sets is selected and mounted as a running wheel set, and a non-selected mounting wheel set which is ready and waiting is selected and mounted later as the running wheel set by replacing the running wheel set currently mounted by the wheel set, the pressure monitoring unit configuring a tire pressure monitoring system together with the pressure sensor unit, the pressure monitoring unit comprising:
a storage which has:
an information list of identification numbers indicating a correspondence between the identification numbers of the pressure sensor units fixed on the wheels and the mounting wheel sets of the vehicle;
current mounting information indicating the mounting wheel set which is currently mounted as the running wheel set; and
set pressure value information indicating a correspondence between set pressure values and monitoring wheel sets, and
a controller which monitors the pressure using pieces of the information stored in the storage and the pressure data which is transmitted by the pressure sensor unit fixed on the running wheel and contains the pressure of the running wheel and the identification number of the pressure sensor unit,
wherein when a number of identification numbers identical to the identification numbers of the information list as many as a number of running wheels mounted on the vehicle are read out within a predetermined time except for the duplication, the controller updates the current mounting information in the storage using the read out identification numbers and executes a pressure monitoring processing using the set pressure value of each running wheel which is determined from the set pressure value information in the storage and the updated current mounting information.

* * * * *